United States Patent
Makishima et al.

(10) Patent No.: US 10,419,526 B2
(45) Date of Patent: Sep. 17, 2019

(54) PLANT CONTROL SYSTEM, CONTROLLER, MANAGER, AND PLANT INFORMATION PROCESSING METHOD

(71) Applicant: YOKOGAWA ELECTRIC CORPORATION, Tokyo (JP)

(72) Inventors: Kazuhiro Makishima, Tokyo (JP);
Toshiyuki Emori, Tokyo (JP);
Masahiro Sakai, Tokyo (JP)

(73) Assignee: Yokogawa Electric Corporation, Musashino, Tokyo (JP)

( * ) Notice: Subject to any disclaimer, the term of this patent is extended or adjusted under 35 U.S.C. 154(b) by 527 days.

(21) Appl. No.: 14/546,177

(22) Filed: Nov. 18, 2014

(65) Prior Publication Data
US 2015/0160630 A1  Jun. 11, 2015

(30) Foreign Application Priority Data

Dec. 10, 2013  (JP) ................... 2013-255420

(51) Int. Cl.
*G05B 11/01* (2006.01)
*H04L 29/08* (2006.01)
(Continued)

(52) U.S. Cl.
CPC .......... *H04L 67/10* (2013.01); *G05B 19/0425* (2013.01); *G05B 23/0286* (2013.01);
(Continued)

(58) Field of Classification Search
None
See application file for complete search history.

(56) References Cited

U.S. PATENT DOCUMENTS 6,298,377 B1 * 10/2001 Hartikainen ....... G05B 19/4185
700/17
2008/0294771 A1 * 11/2008 Hermes .............. G05B 23/0267
709/224
(Continued)

FOREIGN PATENT DOCUMENTS

EP  1921527 A2  5/2008
EP  2345942 A2  7/2011
(Continued)

OTHER PUBLICATIONS

Mori Hiroshi et al., "Field Device Management Package PRM", Yokogawa Tech. Rep., 2001, pp. 153-156, vol. 45, No. 3.
(Continued)

*Primary Examiner* — Diem K Cao
(74) *Attorney, Agent, or Firm* — Sughrue Mion, PLLC

(57) ABSTRACT

A plant control system includes a controller configured to control a plant by using process data, the controller transmitting the process data to a field device and receiving the process data from the field device, the controller obtaining field information indicating a state of the field device from the field device, the field device being installed in the plant, and the field device performing at least one of a measurement and a manipulation which are necessary for the control of the plant, and a manager configured to manage a state of the plant by collecting the field information from the field device, wherein at least one of the controller and the manager creates information indicating a normality of the plant by using the field information.

18 Claims, 5 Drawing Sheets

(51) Int. Cl.
*G05B 19/042* (2006.01)
*G05B 23/02* (2006.01)

(52) U.S. Cl.
CPC ............ *G05B 2219/25428* (2013.01); *G05B 2219/31121* (2013.01)

(56) References Cited

U.S. PATENT DOCUMENTS

| | | | | |
|---|---|---|---|---|
| 2009/0292524 A1* | 11/2009 | Anne | ................ | G05B 19/0426 703/25 |
| 2009/0292995 A1* | 11/2009 | Anne | .................... | H04L 12/413 715/736 |
| 2010/0318934 A1* | 12/2010 | Blevins | ................ | G05B 13/048 715/772 |
| 2012/0310380 A1* | 12/2012 | Karaffa | .............. | G05B 19/0425 700/80 |
| 2014/0277604 A1* | 9/2014 | Nixon | ............... | G06F 15/17331 700/47 |
| 2014/0282227 A1* | 9/2014 | Nixon | ................. | G06F 17/5009 715/786 |

FOREIGN PATENT DOCUMENTS

| | | |
|---|---|---|
| JP | 2006-146631 A | 6/2006 |
| JP | 2008-262375 A | 10/2008 |
| WO | 9742553 A1 | 11/1997 |

OTHER PUBLICATIONS

Mori Hiroshi et al., "PRM Field Device Management Package", Yokogawa Tech. Rep., 2001, pp. 20-23, English Edition, No. 32.
Mori Hiroshi et al., "Field Device Management Package PRMP", Yokogawa Tech. Rep. , 2001, vol. 45, No. 3, pp. 153-156.
Mori Hiroshi et al., "PRM Field Device Management Package", Yokogawa Tech. Rep., 2001, English Edition, No. 32, pp. 20-23.

* cited by examiner

PLANT CONTROL SYSTEM, CONTROLLER, MANAGER, AND PLANT INFORMATION PROCESSING METHOD

BACKGROUND OF THE INVENTION

Field of the Invention

The disclosure relates to a plant control system, a controller, a manager, and a plant information processing method.

Priority is claimed on Japanese Patent Application No. 2013-255420, filed Dec. 10, 2013, the contents of which are incorporated herein by reference.

Description of Related Art

A DCS (Distributed Control System) is installed in a plant and a factory (hereinafter called simply "plant" as a generic name of them). In the distributed control system, a field device (for example, a measurement device, an operation device, a display device, an alarm device, or other devices) and a controller controlling the field device are connected via a communication unit. By the distributed control system, an advanced automatic operation is implemented. In the distributed control system, process data necessary for a process control is transferred mutually between the controller and the field device.

Recently, a PAM (Plant Asset Management) system is often installed with the distributed control system so as to increase efficiency of the plant to a maximum extent possible. The plant asset management system performed facility maintenance and predictive maintenance of devices and apparatuses installed in the plant, and the plant asset management system maintains and manages the facility in an appropriate state over a long time. In the plant asset management system, a manager which is a core apparatus of the plant asset management system collects information necessary for the facility management from the field device. Between the plant asset management system and the distributed control system, alarm information of the field device collected by the plant asset management system is transmitted to the distributed control system.

In the non-patent document 1 (Mori, Machida, Ozaki, Sukegawa, "Field Device Management Package "PRM"," YOKOGAWA technical report, Vol. 45, No. 3, 2001), an exemplary plant control system in which the distributed control system and the plant asset management system are installed is disclosed. Specifically, in the plant control system disclosed in the non-patent document 1, the distributed control system includes an FCS (Field Control Station) and an HIS (Human Interface Station), and the plant asset management system includes a server of a PRM (registered trademark) (Plant Resource Manager) and a client.

In many cases, the field devices used by the distributed control system and the plant asset management system have basic functions. For example, the basic functions include transferring a measurement result such as a flow rate, a temperature, and so on, or adjusting an aperture of a valve under the control of the controller. However, because the recent field devices are digitalized and become intelligent, and most of the recent field devices have an additional function (for example, self-diagnosis function) in addition to the basic functions.

Because the field devices are digitalized and become intelligent, a large amount of information is obtained from the field devices with the information obtained by the basic function. For example, information indicating a current state of the field device is obtained from the field device having the self-diagnosis function. For example, because an abnormality of the field device can be detected early by using the obtained information, it is useful for operating the plant safely and efficiently.

However, the more the amount of the information obtained from the field device is, the more load of the apparatus (the controller in the distributed control system and the manager in the plant asset management system) processing the information is. Also, it is difficult to distinguish between necessary information and unnecessary information. Therefore, although many types of information can be obtained by the field device which is digitalized and intelligent, there is a problem that the information obtained from the field device cannot be used effectively.

SUMMARY

A plant control system may include a controller configured to control a plant by using process data, the controller transmitting the process data to a field device and receiving the process data from the field device, the controller obtaining field information indicating a state of the field device from the field device, the field device being installed in the plant, and the field device performing at least one of a measurement and a manipulation which are necessary for the control of the plant, and a manager configured to manage a state of the plant by collecting the field information from the field device, wherein at least one of the controller and the manager creates information indicating a normality of the plant by using the field information.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Object of some embodiments of the present invention is to provide a plant control system, a controller, a manager, and a plant information processing method, which can obtain useful information for improving normality of the plant from the large amount of information obtained from the field device.

(Plant Control System)

Figure 1:
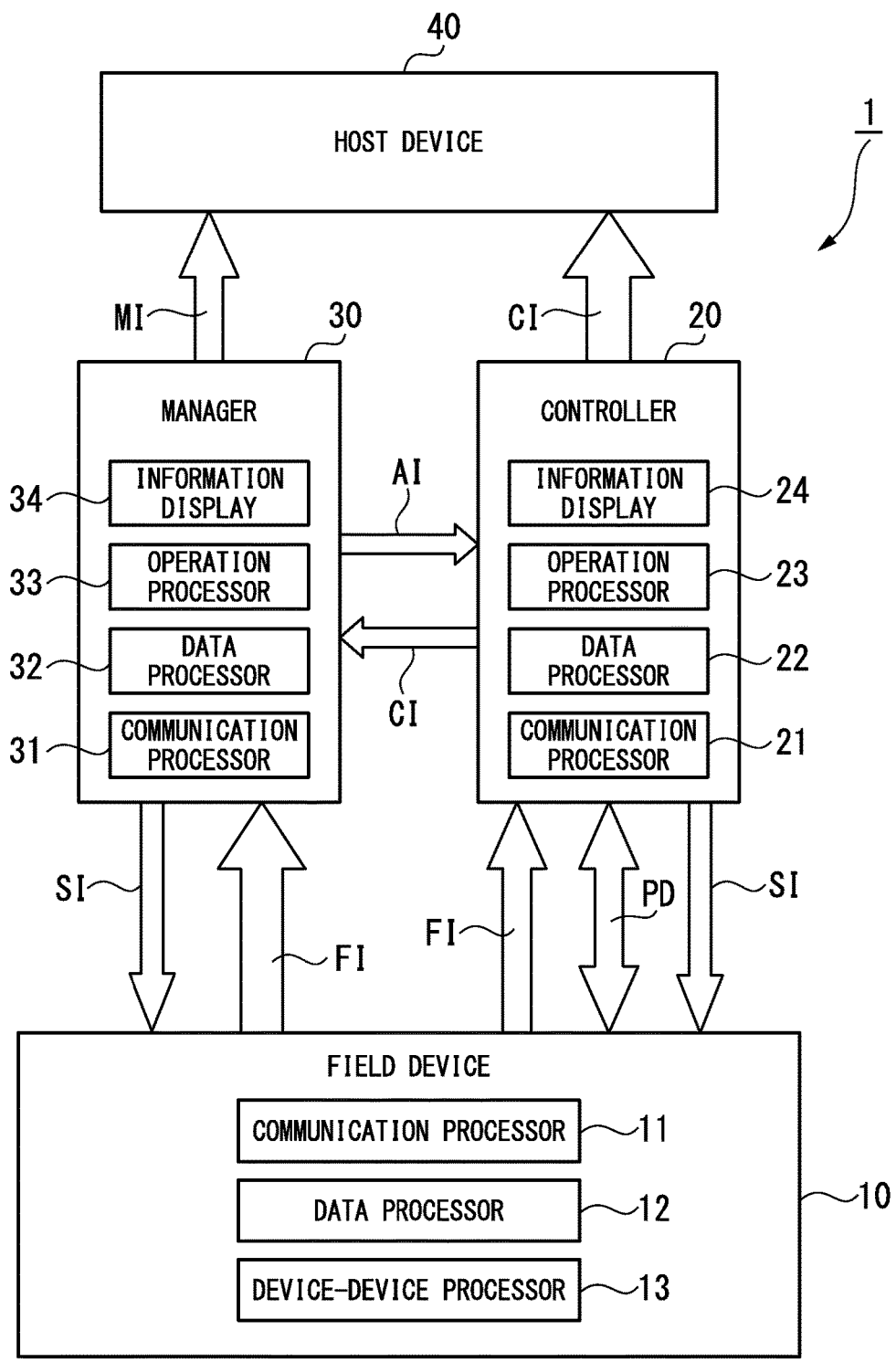
FIG. 1 is a block diagram illustrating a main part of the plant control system in an exemplary embodiment.

FIG. 1 is a block diagram illustrating a main part of the plant control system in an exemplary embodiment. As shown in FIG. 1, the plant control system 1 includes a field device 10, a controller 20, a manager 30, and a host device 40. The plant control system 1 controls an industrial process implemented in the plant (not shown). The plant control system 1 manages facilities such as a device (for example, the field device 10) and apparatus which are installed in the plant. The plant includes an industrial plant such as a chemical industrial plant, a plant managing and controlling a wellhead such as a gas field and an oil field, a plant managing and controlling a generation of electric power such as water power, fire power, nuclear power, and so on, a plant managing and controlling a power harvesting such as solar power, wind power, and so on, a plant managing and controlling water supply and sewerage systems, a dam, and so on.

The field device 10 is installed at a field site in the plant, and the field device 10 performs measurements and operations which are necessary for controlling the industrial process under the control of the controller 20. Specifically, the field device 10 is such as a sensor device (for example, a flowmeter, a temperature sensor, a gas sensor, and a vibration sensor), a valve device (for example, a flow control valve and an on-off valve), an actuator device (for example, a fan and a motor), an imaging device (for example, a camera and a video camera recording circumstances and objects in the plant), a sound device (for example, a microphone collects an abnormal noise in the plant, and a speaker generating an alarm sound), a position detection device outputting position information of each device, and other devices. Although a plurality of the field devices are disposed in the plant, to simplify the drawing in FIG. 1, the plurality of the field devices are organized and illustrated as the field device 10.

The field device 10 (each of the field devices installed in the plant) includes a communication processor 11, a data processor 12, and a device-device processor 13. The communication processor 11 communicates with the controller 20 and the manager 30 which are positioned higher than the field device 10. Also, the communication processor 11 communicates with the other field devices. The communication processor 11 communicates with the controller 20, the manager 30, and the other field devices with a wire communication via a network and a communication bus (not shown), or a wireless communication in conformity with an industrial wireless communication standard such as ISA 100.11a, WirelessHART (registered trademark), and so on.

As shown in FIG. 1, the communication processor 11 transmits process data D necessary for a process control to the controller 20 and receives the process data D from the controller 20. For example, the communication processor 11 transmits measurement data of a state quantity (for example, flow quantity of fluid) in an industrial process to the controller 20, and the communication processor 11 receives control data (for example, data for controlling the flow quantity of fluid) transmitted from the controller 20. Also, the communication processor 11 transmits field information FI indicating a state of the field device 10 to the controller 20 and the manager 30, and the communication processor 11 receives optimization setting information SI transmitted from the controller 20 and the manager 30.

The field information FI transmitted to the controller 20 includes at least one of aged deterioration information indicating an aged deterioration state of the field device 10, stress information indicating a stress of the field device 10, and diagnosis information indicating a result of a self-diagnosis performed by the field device 10. The diagnosis information includes a result of a diagnosis in which the plurality of the field devices of the field device 10 exchange information with each other and perform the diagnosis in cooperation. The field information FI transmitted to the manager 30 includes the aged deterioration information, the stress information, and the diagnosis information which are described above. The field information FI transmitted to the manager 30 further includes alarm information and five senses information. The field information FI can be called big data obtained in the field of the plant. Although not shown in FIG. 1, the field device 10 includes a self-diagnosis function for diagnosing an abnormal state of circuits, functions, and state quantity sensors by using only information obtained in the self-device.

The optimization setting information SI is information for optimizing the field information FI transmitted from the field device 10 to the controller 20 or the manager 30. For example, the optimization setting information SI is information for optimizing a sensitivity of the alarm detected by the field device 10, an importance of the alarm, and a destination of the alarm. Also, the optimization setting information SI is information for not transmitting an unnecessary alarm to the controller 20 and the manager 30. The optimization setting information SI is used so as to suppress the generation of the unnecessary alarm and reduce the load of the controller 20 and the manager 30.

The data processor 12 collects various types of information (for example, information indicating a result of the self-diagnosis) obtained from the self-device and various types of information obtained from other field devices. The data processor 12 selects information from the collected various information and processes the selected information. Also, the data processor 12 transmits the selected and processed information from the communication processor 11 to the controller 20 or the manager 30. As described above, the data processor 12 collects, selects, and processes the various types of information of the self-device and the other devices, and the data processor 12 transmits the various types of information to the controller 20 or the manager 30. It is because a communication load and a processing load of the controller 20 or the manager 30 can be reduced and an optimal process can be performed by selecting and processing the information in the field in which the information is collected.

The device-device processor 13 performs a diagnosis process of using information obtained from the other field devices and a process of selecting the alarm. Specifically, the device-device processor 13 performs a mutual diagnosis as the diagnosis process. The mutual diagnosis is a diagnosis in which the plurality of field devices supply information with each other and diagnose an abnormal state of the self-device and the other field device by using the shared information. In the mutual diagnosis, a higher-level diagnosis than the self-diagnosis described above can be performed. Along with the abnormality of the field device, an abnormality of the process and the plant such as corrosion of a pipe in which fluid flows, pulsation of fluid, and cavitation can be diagnosed. The device-device processor 13 performs the mutual diagnosis and the process of selecting the alarm. It is because a communication load and a processing load of the controller 20 or the manager 30 can be reduced and an optimal process can be performed by selecting and processing the information in the field in which the information is collected.

The process of collecting, selecting, and processing the various types of information performed by the data processor 12 and the mutual diagnosis and the process of selecting the alarm which are performed by the device-device processor 13 are supposed to be performed by the controller 20 or the manager 30 intrinsically. In the present embodiment, a part of the process supposed to be performed by the controller 20 or the manager 30 intrinsically is performed by the field device 10, and the process is distributed. Therefore, in the present embodiment, the load of the controller 20 and the manager 30 can be reduced and an optimal process can be performed.

The controller 20 is a core apparatus of a DCS (Distributed Control System). The controller 20 transmits the process data PD to the field device 10 and receives the process data PD from the field device 10, and the controller 20 controls the industrial process. For example, the controller 20 is operated by a plant operator operating the plant. As shown in FIG. 1, the controller 20 includes a communication processor 21, a data processor 22, an operation processor 23, and an information display 24 (display device).

The communication processor 21 communicates with the field device 10 and the manager 30. Same as the communication processor 11 of the field device 10, the communication processor 21 communicates with a wire communication via a network and a communication bus (not shown), or a wireless communication in conformity with an industrial wireless communication standard such as ISA 100.11a, WirelessHART (registered trademark), and so on. Although not shown in FIG. 1, the controller 20 includes a communication unit communicating with the host device 40.

As shown in FIG. 1, the communication processor 21 transmits process data D necessary for the process control to the field device 10 and receives the process data D from the field device 10. For example, the communication processor 21 receives the measurement data (for example, flow quantity of fluid) transmitted from the field device 10, and the communication processor 21 transmits the control data (for example, data for controlling the flow quantity of fluid) to the field device 10. Also, the communication processor 21 receives the field information FI transmitted from the field device 10, and the communication processor 21 transmits the optimization setting information SI to the field device 10.

The communication processor 21 transmits control information CI for controlling the plant to the manager 30, and the communication processor 21 receives alarm information AI transmitted from the manager 30. The control information CI is transmitted from the controller 20 to the manager 30 so that the manager 30 can recognize the status of the plant more particularly and precisely than ever before by taking account of a past control status (for example, the aged deterioration and the stress) of the field device 10. Also, the control information CI is transmitted to the host device 40.

The data processor 22 calculates control data (data for controlling an aperture of a valve) necessary for the process control by using the process data PD (for example, flow quantity of fluid) transmitted from the field device 10. The data processor 22 calculates the control information CI to be transmitted to the manager 30. Also, the data processor 22 calculates the optimization setting information SI for optimizing the field information FI transmitted from the field device 10.

The data processor 22 generates normality information indicating a normality of the plant by using the field information FI transmitted from the field device 10. Specifically, the data processor 22 calculates a quality-normality KPI (Key Performance Indicator: first normality information) indicating a normality of products produced in the plant by using the field information FI (the aged deterioration information, the stress information, and the diagnosis information) and the process data PD. The products include intermediate products along with final products. Specific examples of calculating the quality-normality KPI will be described later.

The data processor 22 performs, along with the processes described above, a process of analyzing the alarm information AI transmitted from the manager 30, a process of generating instruction information (message) to be displayed on the information display 24, and a process of comprehensively analyzing the state of the device. The process of comprehensively analyzing the state of the device includes a process of analyzing the current state of the field device 10 and comparing the current state with history information indicating the past state of the field device 10.

The operation processor 23 performs a process of operating the field device 10. For example, the operation processor 23 sets a parameter (measurement parameter, and operation parameter) to the field device 10 in accordance with an instruction from the plant operator operating the controller 20. In a case that the optimization setting information SI is calculated by the data processor 22, the operation processor 23 sets the optimization setting information SI to the field device 10 via the communication processor 21. That is to say, the operation processor 23 configures the field device 10 so as to optimize the field information FI output from the field device 10. In the field device of which the optimization setting information SI is set, for example, the sensitivity of the alarm, the importance of the alarm, and the destination of the alarm are optimized.

The information display 24 includes, for example, a display device such as a liquid crystal display. The information display 24 displays various types of information under the control of the data processor 22. For example, the information display 24 displays the process data (the measurement data transmitted from the field device 10 and the control data transmitted to the field device 10) transmitted to or transmitted from the field device 10, information indicating an internal state of the field device 10, the alarm generated from the field device 10, various types of messages, and other information. When the quality-normality KPI is calculated by the data processor 22, the information display 24 displays the calculated quality-normality KPI.

The manager 30 is a core apparatus of the plant asset management (PAM) system. The manager 30 manages the state of the plant by collecting the field information FI from the field device 10. For example, the manager 30 is operated by a worker maintaining the plant. As shown in FIG. 1, the manager 30 includes a communication processor 31, a data processor 32, an operation processor 33, and an information display 34 (display device).

The communication processor 31 communicates with the field device 10 and the controller 20. Same as the communication processor 21 of the controller 20, the communication processor 31 communicates with a wire communication via a network and a communication bus (not shown), or a wireless communication in conformity with an industrial wireless communication standard such as ISA 100.11a, WirelessHART (registered trademark), and so on. Although not shown in FIG. 1, the manager 30 includes a communication unit communicating with the host device 40.

As shown in FIG. 1, the communication processor 31 collects the field information FI transmitted from the field device 10, and the communication processor 31 transmits the optimization setting information SI to the field device 10. Also, the communication processor 31 transmits the alarm information AI to the controller 20, and the communication processor 31 receives the control information CI transmitted from the controller 20. Maintenance information MI of the plant is transmitted to the host device 40 by a communication unit (not shown).

The data processor 32 calculates the maintenance information MI necessary for managing the state of the plant by using the field information FI collected by the communication processor 31. Specifically, the data processor 32 performs facility maintenance and predictive maintenance of the field device 10 or the like included in the plant, and the data processor 32 calculates the maintenance information MI (for example, information indicating an optimum maintenance timing and an optimum exchange timing of the devices) necessary for maintaining and managing the facility in an appropriate state over a long time. Also, the data processor 32 calculates the optimization setting information SI for optimizing the field information FI transmitted from the field device 10.

The data processor 32 generates normality information indicating a normality of the plant by using the field information FI transmitted from the field device 10. Specifically, the data processor 32 calculates a facility-normality KPI (second normality information) indicating a normality of the facility installed in the plant including the field device 10 by using the field information FI (the aged deterioration information, the stress information, the diagnosis information, the alarm information, and the five senses information) and the control information CI transmitted from the controller 20. Specific examples of calculating the facility-normality KPI will be described later.

Along with the processes described above, the data processor 32 performs a process of collecting, selecting, and processing the alarm information transmitted from the field device 10, a process of generating instruction information (message) displayed on the information display 34, a process of generating information indicating a state of the devices, and so on. The information indicating a state of the devices is generated by analyzing and processing data of a state of the field device 10, comparing the current state with the history information indicating the past state of the field device 10, comprehensively analyzing the maintenance and the diagnosis, and so on.

Same as the operation processor 23 of the controller 20, the operation processor 33 performs a process of operating the field device 10. For example, the operation processor 33 sets a parameter (measurement parameter, and operation parameter) to the field device 10 in accordance with an instruction from the plant worker operating the manager 30. In a case that the optimization setting information SI is calculated by the data processor 32, the operation processor 33 sets the optimization setting information SI to the field device 10 via the communication processor 31. That is to say, the operation processor 33 configures the field device 10 so as to optimize the field information FI output from the field device 10.

Same as the information display 24 of the controller 20, for example, the information display 34 includes a display device such as a liquid crystal display. The information display 34 displays various types of information under the control of the data processor 32. For example, the information display 34 displays the maintenance information MI calculated by the data processor 32, the alarm generated from the field device 10, various types of messages, and other information. When the facility-normality KPI is calculated by the data processor 32, the information display 34 displays the calculated facility-normality KPI.

The host device 40 is a device for comprehensively monitoring the control state and the management state of the plant. The host device 40 is operated by a manager managing the plant. The host device 40 receives the control information CI transmitted from the controller 20 and the maintenance information MI transmitted from the manager 30. The host device 40 calculates information useful for managing the plant by using the control information CI and the maintenance information MI. The host device 40 displays the calculated information on a display device (not shown).

(Controller)

Figure 2:
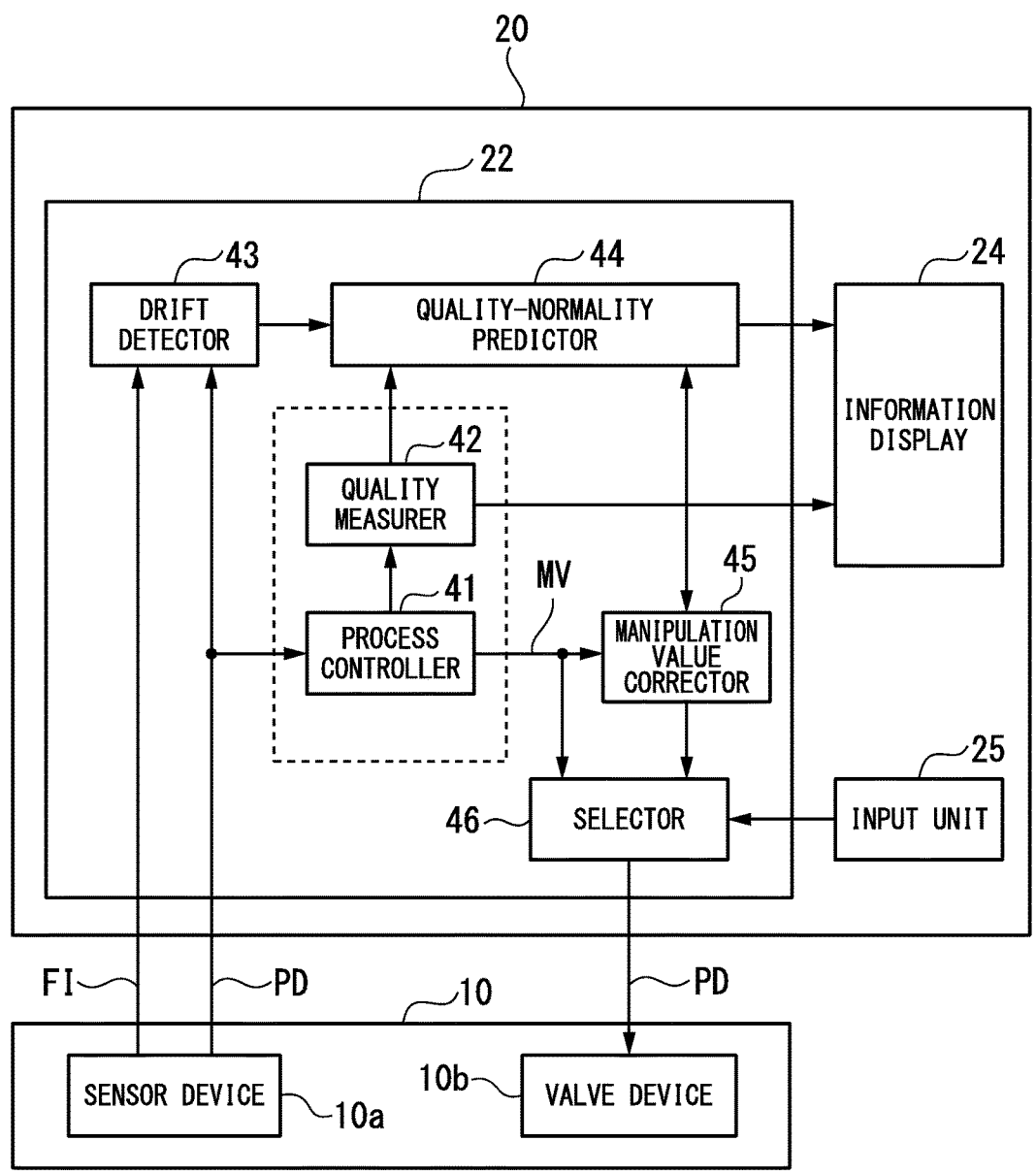
FIG. 2 is a block diagram illustrating a main part of the controller in the exemplary embodiment.

FIG. 2 is a block diagram illustrating a main part of the controller in the exemplary embodiment. In FIG. 2, parts of the controller 20 necessary for calculating the quality-normality KPI are illustrated. In FIG. 2, parts that correspond to those in FIG. 1 are assigned the same reference numerals. So as to understand easily, in FIG. 2, a sensor device 10a measuring the flow quantity of fluid and a valve device 10b controlling the flow quantity of fluid are illustrated as an example of the field device 10.

As shown in FIG. 2, the data processor 22 of the controller 20 includes a process controller 41, a quality measurer 42, a drift detector 43, a quality-normality predictor 44, a manipulation value corrector 45, and a selector 46. The process controller 41 performs a process necessary for controlling an industrial process by using the process data PD obtained from the field device 10. Specifically, for example, the process controller 41 calculates manipulation value MV for manipulating (controlling) the valve device 10b by using the process data PD (measurement data indicating a result of measuring the flow quantity of fluid) transmitted from the sensor device 10a.

The quality measurer 42 measures basic data necessary for calculating the quality-normality KPI by using information (information related to the process control) obtained from the process controller 41. The basic data obtained by the quality measurer 42 is transmitted to the quality-normality predictor 44 and the information display 24. The process controller 41 and the quality measurer 42 are parts for controlling the industrial process which is an original function of the controller 20.

The process data PD and the field information FI transmitted from the sensor device 10a are input to the drift detector 43. The drift detector 43 detects a drift of the process data PD by using the process data PD and the field information FI. The drift of the process data PD is a change of the process data PD caused by an abnormality (for example, failure of the sensor device 10a or the valve device 10b) generated in the plant. Because it is difficult to detect the drift by using only the process data PD, the drift is detected by further using the field information FI at a time that the process data is changed. For example, there is a case that the state of the field device affects the drift caused by the abnormality generated in the process. Therefore, comprehensive determination and calculation can be performed by using the field information FI.

When the drift detector 43 detects the drift of the process data PD, the quality-normality predictor 44 predicts the quality-normality KPI of the products produced in the plant. Specifically, the quality-normality predictor 44 predicts a change of the quality-normality KPI in a case that an operation state of the plant at a time that the drift is generated is continued. Also, the quality-normality predictor 44 calculates a time that elapses before the quality-normality KPI is to be out of a proper quality range and to be "improper".

The quality-normality predictor 44 calculates a correction value of a manipulation value (for example, a correction value of the manipulation value MV for manipulating the valve device 10b) necessary for keeping the quality-normality KPI within the proper quality range. Also, the quality-normality predictor 44 predicts the change of the quality-normality KPI in a case of being manipulated based on the corrected manipulation value. Information indicating the prediction result of the quality-normality predictor 44 is transmitted to the information display 24 and displayed.

The quality-normality predictor 44 includes a database (not shown) indicating a relation between a past operation state of the plant and the quality-normality KPI and a dynamic simulator (not shown) calculating the state of the plant by using the database and a current control information (the manipulation value MV calculated by the process controller 41). The quality-normality predictor 44 predicts the quality-normality KPI and calculates the correction value of the manipulation value described above by using the database and the dynamic simulator.

The manipulation value corrector 45 corrects the manipulation value MV calculated by the process controller 41 based on the correction value calculated by the quality-normality predictor 44. The selector 46 selects, based on instructions transmitted from an input unit 25 (external instructions), one of the manipulation value MV transmitted from the process controller 41 and the manipulation value MV corrected by the manipulation value corrector 45. The selector 46 outputs the selected manipulation value MV as the process data PD (control data). The input unit 25 includes a keyboard and a mouse. For example, the plant operator operating the controller 20 inputs an instruction with the input unit 25.

(Manager)

Figure 3:
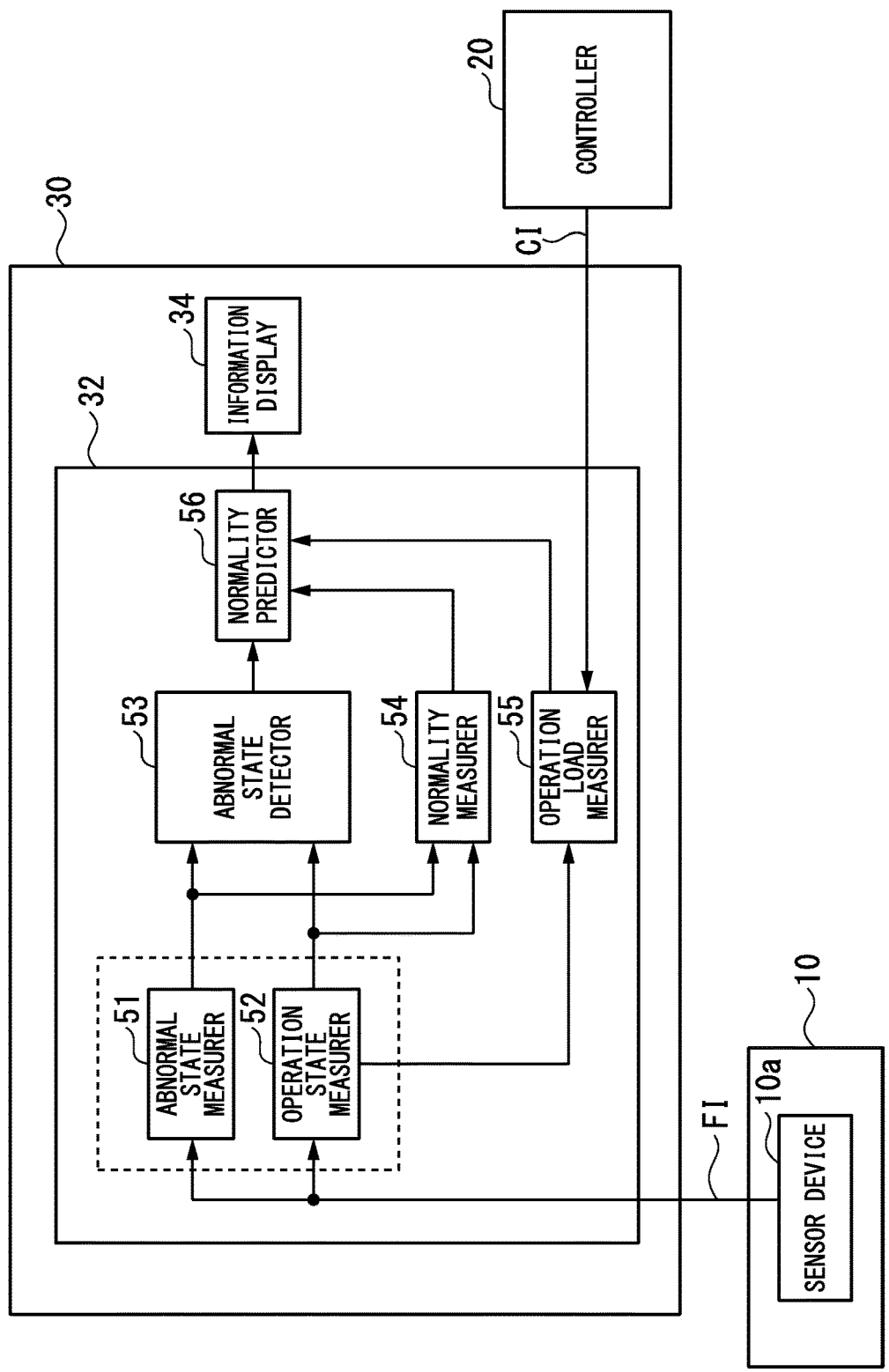
FIG. 3 is a block diagram illustrating a main part of the manager in the exemplary embodiment.

FIG. 3 is a block diagram illustrating a main part of the manager in the exemplary embodiment. In FIG. 3, parts of the manager 30 necessary for calculating the facility-normality KPI are illustrated. In FIG. 3, same as FIG. 2, parts that correspond to those in FIG. 1 are assigned the same reference numerals, and a sensor device 10*a* measuring the flow quantity of fluid is illustrated as an example of the field device 10.

As shown in FIG. 3, data processor 32 of the manager 30 includes an abnormal state measurer 51, an operation state measurer 52, an abnormal state detector 53, a normality measurer 54, an operation load measurer 55, and a normality predictor 56. The abnormal state measurer 51 collects a parameter indicating a state (diagnosis result) of the facility (devices and apparatuses) installed in the plant, and the abnormal state measurer 51 measures an abnormal state of the each facility. For example, the abnormal state measurer 51 measures a change of a temperature and a vibration of a motor, and so on. The operation state measurer 52 collects a parameter indicating an operating status of the facility installed in the plant, and the operation state measurer 52 measures an operation state of the each facility. For example, the operation state measurer 52 measures a rotation speed and a rotation time of a motor, and so on. The abnormal state measurer 51 and the operation state measurer 52 are parts for performing a management of the state of the plant which is an original function of the manager 30.

The abnormal state detector 53 detects presence or absence of an abnormality of the facility installed in the plant based on the abnormal state of the each facility measured by the abnormal state measurer 51 and the operation state of the each facility measured by the operation state measurer 52. The normality measurer 54 creates the facility-normality KPI based on the change of the state of the each facility obtained from the measurement result of the abnormal state measurer 51 and the usage status of the each facility obtained from the measurement result of the operation state measurer 52. The operation load measurer 55 measures an operation load of the facility based on the usage status of the facility. Specifically, the operation load measurer 55 measures the operation load of the facility by using the measurement results of the operation state measurer 52 and the control information CI transmitted from the controller 20.

In a case that the abnormal state detector 53 detects the abnormality of the facility installed in the plant, the normality predictor 56 predicts the facility-normality KPI by using the facility-normality KPI created by the normality measurer 54 and the operation load measured by the operation load measurer 55. Specifically, the normality predictor 56 predicts a change of the facility-normality KPI at each of different operation loads, and the normality predictor 56 calculates an operation continuable time in which the operation of the plant can be continued.

(Operation of the Plant Control System)

Next, an operation of the plant control system will be described. First, an operation of the controller 20 will be described. The controller 20 transmits the process data PD to the field device 10 and receives the process data PD from the field device 10, and the controller 20 performs the plant control. Specifically, in the controller 20, the communication processor 21 receives the process data PD (for example, measurement data transmitted from the sensor device 10*a* shown in FIG. 2) transmitted from the field device 10 at constant time interval (for example, one second interval), and the data processor 22 calculates the manipulation value of the field device 10 (for example, the valve device 10*b* shown in FIG. 2) by using the process data PD received by the communication processor 21.

The process data PD received by the communication processor 21 of the controller 20 is input to the process controller 41 of the data processor 22. The process controller 41 calculates the manipulation value MV of the field device 10 (for example, the valve device 10*b*). The quality measurer 42 shown in FIG. 2 measures the basic data necessary for predicting the quality-normality KPI by using the information obtained from the process controller 41. The basic data measured by the quality measurer 42 is transmitted to the quality-normality predictor 44 and the information display 24.

The manipulation value MV is transmitted to the field device 10 (for example, the valve device 10*b*) via the selector 46 as the process data PD (control data). When the field device 10 receives the process data PD transmitted from the controller 20, a manipulation according to the process data PD (for example, controlling an aperture of the valve 10*b*) is performed. These operations are repeated at constant time interval (for example, one second interval). When the data processor 22 of the controller 20 calculates the control information CI relating to the process control, the control information CI is transmitted from the communication processor 21 to the manager 30.

Figure 4:
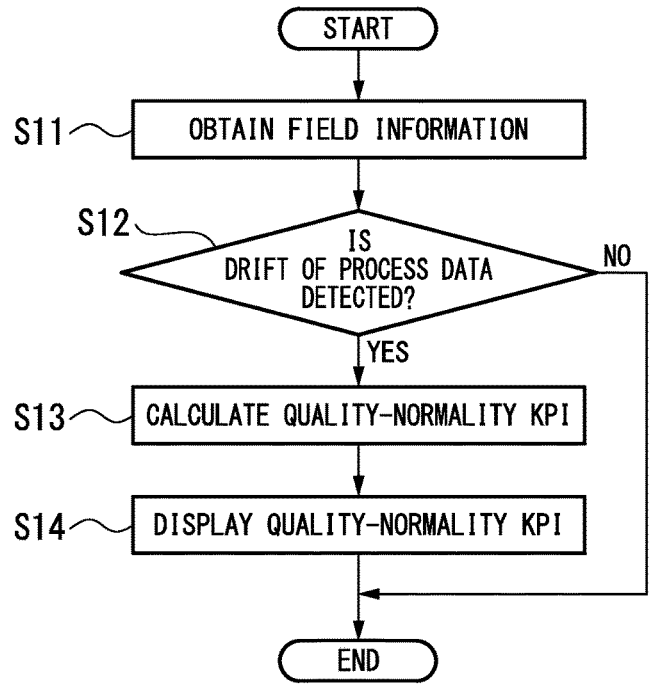
FIG. 4 is a flowchart illustrating a process for calculating the quality-normality KPI in the exemplary embodiment.

In parallel with the operations related to the plant control described above, the controller 20 calculates the normality information (quality-normality KPI) indicating the normality of the plant. FIG. 4 is a flowchart illustrating a process for calculating the quality-normality KPI in the exemplary embodiment. The process of the flowchart shown in FIG. 4 is performed at constant time interval (for example, equal to or longer than the interval of the plant control) or non-constant time interval.

When the process shown in FIG. 4 is started, the controller 20 obtains the field information FI transmitted from the field device 10 (step S11: first step). For example, the controller 20 obtains the aged deterioration information indicating an aged deterioration state of the field device 10, the stress information indicating a stress of the field device 10, and the diagnosis information indicating a result of a self-diagnosis performed by the field device 10.

When the controller 20 obtains the field information FI transmitted from the field device 10 (for example, the sensor device 10*a*), the drift detector 43 in the data processor 22 of the controller 20 detects the drift of the process data PD by using the process data PD transmitted from the sensor device 10*a* and the obtained field information FI. The detection result of the drift detector 43 is transmitted to the quality-normality predictor 44. The quality-normality predictor 44 determines whether the drift of the process data PD is detected or not (step S12).

In a case that the quality-normality predictor 44 determines the drift of the process data PD is not detected (NO at step S12), the process shown in FIG. 4 ends. On the other hand, in a case that the quality-normality predictor 44 determines the drift of the process data PD is detected (YES at step S12), the quality-normality predictor 44 predicts the quality-normality KPI by using the basic data calculated by the quality measurer 42 (step S13: second step).

Specifically, the quality-normality predictor 44 predicts a change of the quality-normality KPI (hereinafter, called "quality trend") in a case that an operation state of the plant at a time that the drift is generated is continued. Also, the quality-normality predictor 44 calculates a time that elapses before the quality-normality KPI is to be out of the proper quality range and to be "improper".

The quality-normality predictor 44 calculates a correction value of a manipulation value (for example, a correction value of the manipulation value MV for manipulating the valve device 10*b*) necessary for keeping the quality-normality KPI within the proper quality range. Also, the quality-normality predictor 44 predicts the change of the quality-normality KPI (hereinafter, called "corrected quality trend") in a case of being manipulated based on the corrected manipulation value. After these processes, the information display 24 displays the prediction result of the quality-normality KPI (the quality trend and the corrected quality trend) obtained by the quality-normality predictor 44 (step S14: second step).

Figure 5:
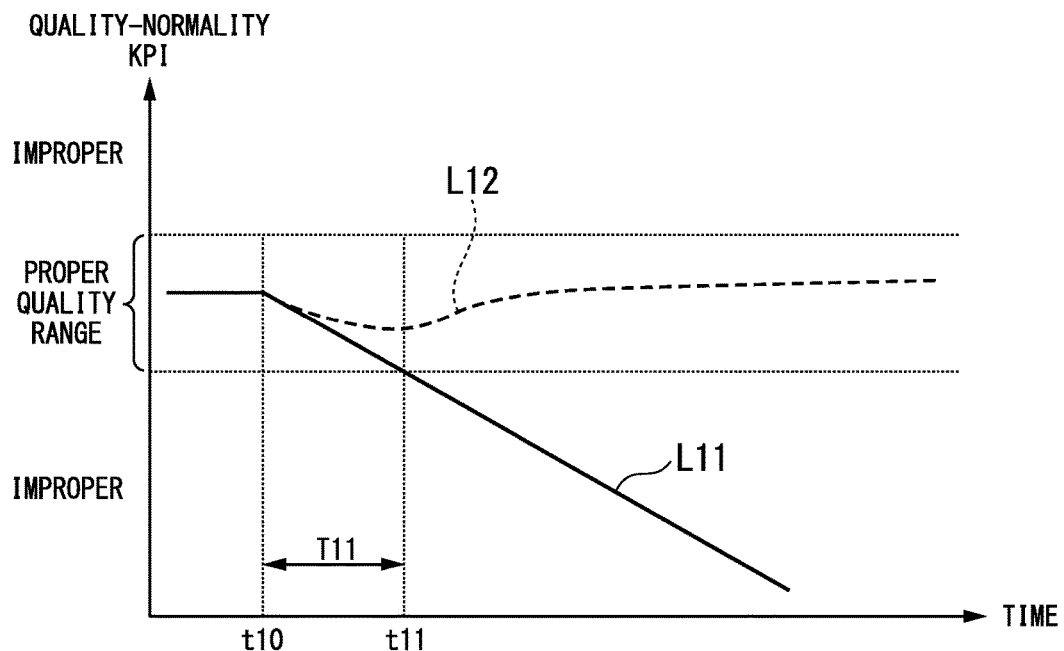
FIG. 5 is a drawing illustrating an example of displaying the quality-normality KPI in the exemplary embodiment.

FIG. 5 is a drawing illustrating an example of displaying the quality-normality KPI in the exemplary embodiment. As shown in FIG. 5, the quality trend and the corrected quality trend are displayed on the information display 24 in the form of a two-dimensional graph. The horizontal axis of the graph indicates a time, and the vertical axis of the graph indicates the quality-normality KPI. In FIG. 5, the curved line L11 represents the quality trend, and the curved line L12 represents the corrected quality trend. In the example of FIG. 5, the drift of the process data PD is generated at a time t10.

In FIG. 5, the time T11 from the time t10 to the time t11 is a predicted time that elapses before the quality-normality KPI is to be out of the proper quality range and to be "improper" in a case that an operation state of the plant at a time that the drift is generated is continued. In other words, the time T11 is a time that elapses before the curved line L11 representing the quality trend is to be out of the proper quality range.

The plant operator refers to the curved line L11 representing the quality trend shown in FIG. 5 so that the plant operator can know that the quality-normality KPI is to be out of the proper quality range in the future and know the predicted time T11 that elapses before the quality-normality KPI is to be "improper". Also, the plant operator refers to the curved line L12 representing the corrected quality trend shown in FIG. 5 so that the quality-normality KPI can be kept within the proper quality range by changing the operation state of the plant.

When the plant operator instructs a change of the operation state with the input unit 25 shown in FIG. 2 after referring to the displayed contents, the selector 46 selects the manipulation value corrected by the manipulation value corrector 45 instead of the manipulation value MV transmitted from the process controller 41 so as to output the manipulation value corrected by the manipulation value corrector 45 as the process data PD (control data). After the selector 46 selects, the manipulation value MV corrected by the manipulation value corrector 45 is transmitted to the valve device 10*b* as the process data PD (control data). The valve device 10*b* is controlled in accordance with the corrected manipulation value MV. In this manner, in response to the instructions from the plant operator (external instructions), the controller 20 corrects the manipulation value of the field device 10 (the valve device 10*b*) in accordance with the correction value calculated by the quality-normality predictor 44, and the controller 20 manipulates the field device 10 (the valve device 10*b*).

In parallel with the operations described above, the data processor 22 of the controller 20 calculates data for optimizing the field information FI obtained from the field device 10. The data calculated by the data processor 22 is transmitted as the optimization setting information SI from the operation processor 23 to the field device 10 via the communication processor 21. By this operation, the setting of the field device 10 is changed. This operation may be performed at constant time interval or only at a time that there is a need that the controller 20 optimizes the field information FI.

Figure 6:
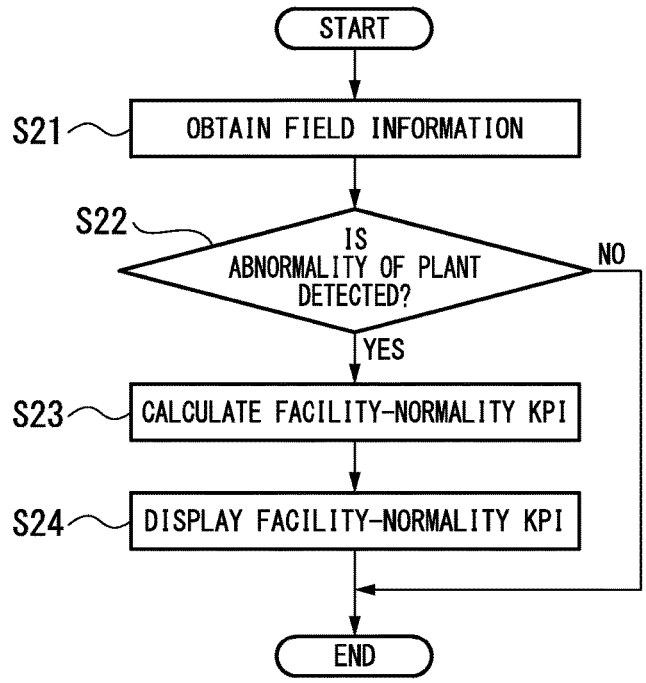
FIG. 6 is a flowchart illustrating a process for calculating the facility-normality KPI in the exemplary embodiment.

Next, the operation of the manager 30 will be described. The manager 30 collects the field information FI and calculates the facility-normality KPI. FIG. 6 is a flowchart illustrating a process for calculating the facility-normality KPI in the exemplary embodiment. The process of the flowchart shown in FIG. 6 is performed at constant time interval (for example, equal to or longer than the interval of the plant control) or non-constant time interval.

The communication processor 31 of the manager 30 obtains the field information FI transmitted from the field device 10 at a predetermined timing (step S21: first step). In a case that the control information CI is transmitted from the controller 20, the communication processor 31 also receives the control information CI. The field information FI obtained by the communication processor 31 is input to the abnormal state measurer 51 and the operation state measurer 52 of the data processor 32 shown in FIG. 3. The control information CI transmitted from the controller 20 is input to the operation load measurer 55 of the data processor 32 shown in FIG. 3.

The abnormal state measurer 51 to which the field information FI is input measures the abnormal state of the field device 10 (for example, the sensor device 10*a*). The operation state measurer 52 to which the field information FI is input measures the operation state of the field device 10 (for example, the sensor device 10*a*). The measurement results of the abnormal state measurer 51 and the operation state measurer 52 are transmitted to the normality measurer 54. The normality measurer 54 creates the facility-normality KPI. The operation load measurer 55 measures the operation load of the facility by using the measurement result of the operation state measurer 52 and the control information CI transmitted from the controller 20.

Also, the measurement results of the abnormal state measurer 51 and the operation state measurer 52 are transmitted to the abnormal state detector 53. The abnormal state detector 53 detects the abnormality of the plant. The detection result of the abnormal state detector 53 is transmitted to the normality predictor 56. The normality predictor 56 determines whether the abnormality of the plant exists or not (step S22). In a case that the normality predictor 56 determines the abnormality of the plant does not exist (NO at step S22), the process shown in FIG. 6 ends.

On the other hand, in a case that the normality predictor 56 determines the abnormality of the plant exists (YES at step S22), the normality predictor 56 predicts the facility-normality KPI by using the facility-normality KPI created by the normality measurer 54 and the operation load measured by the operation load measurer 55 (step S23: second step).

Specifically, the normality predictor 56 predicts a change of the facility-normality KPI (hereinafter, called "facility trend") at each of different operation loads, and the normality predictor 56 calculates the operation continuable time in which the operation of the plant can be continued. After these processes, the information display 34 displays the prediction result of the facility-normality KPI (the facility trend) obtained by the normality predictor 56 (step S24: second step).

Figure 7:
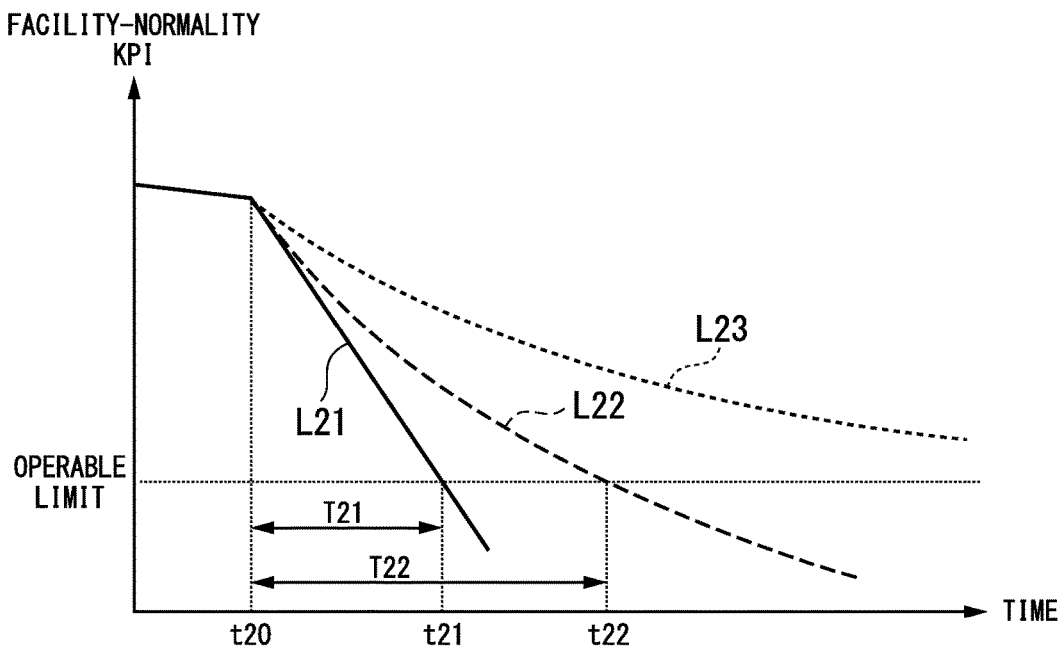
FIG. 7 is a drawing illustrating an example of displaying the facility-normality KPI in the exemplary embodiment.

FIG. 7 is a drawing illustrating an example of displaying the facility-normality KPI in the exemplary embodiment. As shown in FIG. 7, the facility trend is displayed on the information display 34 in the form of a two-dimensional graph. The horizontal axis of the graph indicates a time, and the vertical axis of the graph indicates the facility-normality KPI. In FIG. 7, the curved line L21 represents the facility trend in a case that the operation load is 100%. The curved line L22 represents the facility trend in a case that the operation load is 70%. The curved line L23 represents the facility trend in a case that the operation load is 40%. In the example of FIG. 7, the abnormality of the plant is generated at a time t20.

In FIG. 7, the time T21 from the time t20 to the time t21 is an operation continuable time in a case that the operation load is 100%. The time T22 from the time t20 to the time t22 is an operation continuable time in a case that the operation load is 70%. The plant worker refers to the graph of the FIG. 7 displayed on the information display 34 so that the plant worker can know the facility trend in a case that the operation state is 100%, 70%, and 40% and know the operation continuable time (a time from when the abnormality is detected to when the facility-normality KPI reaches the operable limit).

In parallel with the operations described above, the data processor 32 of the manager 30 calculates data for optimizing the field information FI obtained from the field device 10. The data calculated by the data processor 32 is transmitted as the optimization setting information SI from the operation processor 33 to the field device 10 via the communication processor 31. By this operation, the setting of the field device 10 is changed. This operation may be performed at constant time interval or only at a time that there is a need that the manager 30 optimizes the field information FI.

As described above, in the present embodiment, the controller 20 and the manager 30 obtain the field information FI transmitted from the field device 10, the manager 30 obtains the control information CI calculated by the controller 20, and the controller 20 and the manager 30 calculate the normality information (the quality-normality KPI and the facility-normality KPI) indicating the normality of the plant by using the field information FI. Therefore, in the present embodiment, the useful normality information (the quality-normality KPI and the facility-normality KPI) improving the normality of the plant can be obtained by using the various types of the field information FI transmitted from the field device 10. By the process, safety, efficiency, and quality of the plant can be improved and life cycle cost can be reduced.

Also, in the present embodiment, the controller 20 and the manager 30 optimize the field information FI transmitted from the field device 10 to the controller 20 and the manager 30 respectively by using the optimization setting information SI. By this process, out of the field information FI transmitted from the field device 10 to the controller 20 and the manager 30, the field information FI unnecessary for the controller 20 and the manager 30 can be reduced preliminarily. As the result, a process of selecting the field information FI can be reduced and the load of the controller 20 and the manager 30 can be reduced.

Although a plant control system, a controller, a manager, and a plant information processing method according to embodiments of the present invention have been described above, the present invention is not restricted to the above-described embodiments, and can be freely modified within the scope thereof. For example, although the foregoing descriptions of the embodiments have been examples in which both of the controller 20 and the manager 30 calculate the normality information (the quality-normality KPI and the facility-normality KPI), only one of the controller 20 and the manager 30 may calculate the normality information. Also, although the foregoing descriptions of the embodiments have been examples in which the controller 20 calculates the quality-normality KPI and the manager 30 calculates the facility-normality KPI, other normality information may be calculated.

Also, although the foregoing descriptions of the embodiments have been examples in which the controller 20 and the manager 30 are separate apparatuses, the controller 20 and the manager 30 may be integrated with each other. Further, at least one of the controller 20 and the manager 30 may be a cloud computer.

The term "configured" is used to describe a component, unit or part of a device includes hardware and/or software that is constructed and/or programmed to carry out the desired function.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A plant control system comprising:
 a controller configured to control a plant by using process data, the controller transmitting the process data to a field device and receiving the process data from the field device, the controller obtaining field information comprising aged deterioration information indicating an aged deterioration state of the field device from the field device, the field device being installed in the plant, and the field device performing at least one of a measurement and a manipulation which are necessary for the control of the plant; and a manager comprising:
- a communication processor configured to obtain field information comprising aged deterioration information indicating an aged deterioration state of a field device from the field device, the field device being installed in a plant, the communication processor receiving a control information from a controller controlling the plant, the control information being for controlling the plant, and the field device performing at least one of a measurement and a manipulation which are necessary for a control of the plant; and
- a data processor configured to manage a state of the plant by collecting the field information from the field device, wherein the data processor configured to create, by using the field information and the control information, a second normality information indicating a facility-normality of the field device installed in the plant, wherein the manager further comprises a second predictor configured to predict a change of the second normality information at each of different operation loads in a case that the data processor detects an abnormality in accordance with the field information, wherein the manager is configured to manage a state of the plant by collecting the field information from the field device, wherein the controller comprises a first data processor configured to create, by using the process data and the field information, a first normality information indicating a quality-normality of products produced by controlling the plant, and wherein the controller further comprises:
- a drift detector configured to detect a drift of the process data by using the process data and the field information; and
- a first predictor configured to predict a change of the first normality information when the drift detector detects the drift of the process data.

2. The plant control system according to claim 1, further comprising:
a first information display configured to display the first normality information.

3. The plant control system according to claim 1, wherein the first predictor is configured to calculate a correction value of a manipulation value of the field device necessary for keeping the normality indicated by the current first normality information within a proper quality range.

4. The plant control system according to claim 3, further comprising:
- a manipulation value corrector configured to correct the manipulation value of the field device in accordance with the correction value; and
- a selector configured to select one of the manipulation value which is not corrected by the manipulation value corrector and the manipulation value corrected by the manipulation value corrector, and the selector outputting the selected manipulation value as the process data.

5. The plant control system according to claim 1, wherein the first data processor is configured to calculate a first optimization setting information and transmit the first optimization setting information to the field device, and the first optimization setting information is for not transmitting an unnecessary alarm from the field device to the controller and the manager.

6. The plant control system according to claim 1, wherein the controller is configured to calculate a control information for controlling the plant, the manager comprises a second data processor configured to receive the control information from the controller and create, by using the field information and the control information, a second normality information indicating a facility-normality of the field device installed in the plant, and the manager comprises a second information display configured to display the second normality information.

7. The plant control system according to claim 6, further comprising:
a second predictor configured to predict a change of the second normality information at each of different operation loads in a case that the manager detects an abnormality in accordance with the field information, wherein the second information display is configured to display the change predicted by the second predictor.

8. The plant control system according to claim 6, wherein the second data processor is configured to calculate a second optimization setting information and transmit the second optimization setting information to the field device, and the second optimization setting information is for not transmitting an unnecessary alarm from the field device to the controller and the manager.

9. A controller comprising:
- a communication processor configured to transmit process data to a field device and receive the process data from the field device, the communication processor obtaining field information comprising aged deterioration information indicating an aged deterioration state of the field device from the field device, the field device being installed in a plant, and the field device performing at least one of a measurement and a manipulation which are necessary for a control of the plant; and
- a data processor configured to control the plant by using the process data, wherein the data processor is configured to create, by using the process data and the field information, a first normality information indicating a normality of a quality of products produced by controlling the plant, and wherein the controller further comprises:
- a drift detector configured to detect a drift of the process data by using the process data and the field information; and
- a first predictor configured to predict a change of the first normality information when the drift detector detects the drift of the process data, wherein the data processor comprises a process controller configured to calculate control information for controlling the plant, wherein the first predictor comprises a database indicating a relation between a past operation state of the plant and the first normality information and a dynamic simulator configured to calculate a state of the plant using the database and the control information, and wherein the first predictor configured to predict the first normality information using the database and the dynamic simulator.

10. The controller according to claim 9, further comprising:
a first information display configured to display the first normality information.

11. The controller according to claim 9, wherein the first predictor is configured to calculate a correction value of a manipulation value of the field device necessary for keeping the normality indicated by the current first normality information within a proper quality range.

12. The controller according to claim 11, further comprising:
a manipulation value corrector configured to correct the manipulation value of the field device in accordance with the correction value; and
a selector configured to select one of the manipulation value which is not corrected by the manipulation value corrector and the manipulation value corrected by the manipulation value corrector, and the selector outputting the selected manipulation value as the process data.

13. The controller according to claim 9, wherein the data processor is configured to calculate a first optimization setting information and transmit the first optimization setting information to the field device, and the first optimization setting information is for not transmitting an unnecessary alarm from the field device to the controller and the manager.

14. A manager comprising:
a communication processor configured to obtain field information comprising aged deterioration information indicating an aged deterioration state of a field device from the field device, the field device being installed in a plant, the communication processor receiving a control information from a controller controlling the plant, the control information being for controlling the plant, and the field device performing at least one of a measurement and a manipulation which are necessary for a control of the plant; and
a data processor configured to manage a state of the plant by collecting the field information from the field device,
wherein the data processor configured to create, by using the field information and the control information, a second normality information indicating a facility-normality of the field device installed in the plant, and
the manager further comprises a second predictor configured to predict a change of the second normality information at each of different operation loads in a case that the data processor detects an abnormality in accordance with the field information.

15. The manager according to claim 14, further comprising:
a second information display configured to display the second normality information.

16. The manager according to claim 15, wherein the second information display is configured to display the change predicted by the second predictor.

17. The manager according to claim 14, wherein the second data processor is configured to calculate a second optimization setting information and transmit the second optimization setting information to the field device, and the second optimization setting information is for not transmitting an unnecessary alarm from the field device to the controller and the manager.

18. A plant information processing method comprising:
obtaining, by a communication processor, field information comprising aged deterioration information indicating an aged deterioration state of a field device from the field device, the field device being installed in a plant, the field device performing at least one of a measurement and a manipulation which are necessary for a control of the plant;
receiving, by the communication processor, a control information from a controller controlling the plant, the control information being for controlling the plant;
managing, by a data processor, a state of the plant by collecting the field information from the field device;
creating, by the data processor, by using the field information and the control information, a second normality information indicating a facility-normality of the field device installed in the plant; and
predicting, by a second predictor, a change of the second normality information at each of different operation loads in a case that the data processor detects an abnormality in accordance with the field information.

* * * * *